US012189781B1

(12) United States Patent
Williams et al.

(10) Patent No.: US 12,189,781 B1
(45) Date of Patent: Jan. 7, 2025

(54) ARTIFICIAL INTELLIGENCE-BASED FUZZING OF CYBER-PHYSICAL SYSTEMS

(71) Applicant: Oceanit Laboratories, Inc., Honolulu, HI (US)

(72) Inventors: Matthew Osamu Williams, Honolulu, HI (US); David Siu, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 779 days.

(21) Appl. No.: 17/481,275

(22) Filed: Sep. 21, 2021

Related U.S. Application Data

(60) Provisional application No. 63/082,703, filed on Sep. 24, 2020.

(51) Int. Cl.
| | |
|---|---|
| *G06F 21/57* | (2013.01) |
| *G06F 11/34* | (2006.01) |
| *G06F 16/901* | (2019.01) |
| *G06N 5/01* | (2023.01) |

(52) U.S. Cl.
CPC ........ *G06F 21/577* (2013.01); *G06F 11/3476* (2013.01); *G06F 16/9024* (2019.01); *G06N 5/01* (2023.01)

(58) Field of Classification Search
CPC .............. G06F 21/577; G06F 11/3476; G06F 16/9024; G06N 5/01
See application file for complete search history.

(56) References Cited

U.S. PATENT DOCUMENTS

| | | | | |
|---|---|---|---|---|
| 11,397,664 B2* | 7/2022 | Lin | .......................... | G06F 21/55 |
| 2020/0162500 A1* | 5/2020 | Ciocarlie | ................ | H04L 67/12 |
| 2020/0175171 A1* | 6/2020 | Rieger | ................ | H04L 63/1433 |
| 2021/0081306 A1* | 3/2021 | Agrawal | ............. | G06F 11/3604 |
| 2021/0089661 A1* | 3/2021 | Rieger | ................ | G06F 11/0736 |

FOREIGN PATENT DOCUMENTS

WO   WO-2018084808 A1 *  5/2018  ............ G06F 11/261

OTHER PUBLICATIONS

Der Aalst, and AK Alves De Medeiros: "Process mining with the heuristics miner-algorithm." Technische Universiteit Eindhoven, Tech. Rep. WP 166 (2006): 1-34.

\* cited by examiner

*Primary Examiner* — Joseph P Hirl
*Assistant Examiner* — Thomas A Gyorfi
(74) *Attorney, Agent, or Firm* — Fresh IP PLC; Clifford D. Hyra; Aubrey Y. Chen

(57) ABSTRACT

Disclosed herein are devices, systems, and methods for the intelligent fuzzing of cyber-physical systems, including the use of artificial intelligence (AI) for such fuzzing. In at least one embodiment, a method is disclosed for intelligent fuzzing, which includes the steps of (1) characterizing "normal" behavior of the cyber-physical system being tested, which may include, for example, utilization of a causal model to analyze causal relationships between various messages sent to and/or from the system being tested, (2) identifying dependency relationships between these various messages and/or generating a dependency graph for the messages, and (3) fuzzing an incoming message from the system under test. The fuzzing process may include querying the causal model to determine if the message is contained within the model. Fuzzing may further include altering the message's contents by, for instance, randomly manipulating particular message fields and/or replacing letters with other letters.

20 Claims, 7 Drawing Sheets

| Channel | Time Stamp | Data |
|---|---|---|
| 1 | 00000000000a9b77 | 7fffdc85 |
| 1 | 00000000000aa81f | 7b1d5f73 |
| 1 | 00000000000ab3af | 7ff60f71 |
| 1 | 00000000000abf3f | 7fd0f747 |
| 1 | 00000000000acacf | fffbff41 |
| 1 | 00000000000ad65f | f0000717 |
| 1 | 00000000000ae1ef | e0200316 |
| 1 | 00000000000aed7f | 7fff6f00 |
| 1 | 00000000000af90f | fff00315 |
| 1 | 000000000019e927 | 7fffdc85 |
| 1 | 000000000019f4df | 7b1d5f73 |
| 1 | 00000000001a006f | 7ff60f71 |
| 1 | 00000000001a0bff | 7fd0f747 |
| 1 | 00000000001a17b7 | fffbff41 |
| 1 | 00000000001a236f | f0000717 |
| 1 | 00000000001a2eff | e0200316 |
| 1 | 00000000001a3a8f | 7fff6f00 |
| 1 | 00000000001a461f | fff00315 |
| 1 | 00000000001ef39f | 38dcfe3f |
| 1 | 000000000022035f | 38dcfe3f |
| 1 | 000000000251e5f | 38dcfe3f |
| 1 | 000000000028395f | 38dcfe3f |

FIG. 1

| Input | Outputs |
|---|---|
| 7b1d5f73 | ee86f73b |
| 7fd0f747 | 6e84fb3b |
| 70002717 | 6e8bfd3b |
| fff00315 | 77d5d717 7affe63b 6e86ff3b 6e8afa3b ee8af83b ee8af23b 6e8fff3b 6e8efb3b 6e8cf93b 6e83fc3b ee82f03b 6e8df73b ee8bff3b 6e8dfb3b 6e87fb3b 6e84f83b ee87f53b 6e85f03b ee8cfd3b ee8bf03b 6e8df83b |
| 6dfffe67 | ecfeff3b 6e8af63b ee8af73b ee8efc3b ee86f13b 6e87f73b 6e85ff3b |
| fbfeff67 | 79feff3b ee85fb3b ee8cf23b ee84f33b 6e82f13b ee82f53b ee82ff3b 6e83fa3b 6e8df43b ee8ff43b ee84f93b |
| 79feff3b | 77d5d717 ee8afe3b 6e84fd3b 6e8afc3b 6e86f93b ee8ff73b ee8ef63b ee8cf43b ee8bf33b ee8ff13b ee8ef03b ee8dff3b ee8cfe3b ee8efa3b ee8df93b 6e8bf73b 6e8ef43b 6e8bf13b 6e8af03b 6e8efe3b 6e8efd3b ee8dfc3b ee8cfb3b 6e8af93b ee8ff83b 6e8ef73b 6e8cf53b 6e8bf43b 6e8af33b ee8ff23b ee8df03b 6e8cff3b 6e8bfe3b ee8afd3b 6e8ffc3b ee8dfa3b 6e8bf83b ee87f63b 6e86f53b ee85f43b ee83f23b ee85fe3b ee87fa3b ee85f83b 6e84f73b 6e83f63b 6e86f33b ee85f23b 6e84f13b 6e83f03b 6e82fe3b 6e86fc3b ee84fa3b 6e83f93b 6e82f83b 6e8cfc3b 6e8bfb3b 6e8ff93b 6e8ef83b 6e8cf63b ee8af43b 6e8ff33b 6e8ef23b 6e8df13b ee8ffd3b 6e8cfa3b 6e86fa3b ee83f73b ee86f43b 6e85f33b 6e84f23b ee83f13b 6e87fe3b ee86fd3b 6e85fc3b ee82f93b 6e85f63b ee84f53b ee83f43b 6e87f23b ee84ff3b ee83fe3b 6e82fd3b 6e8ff63b ee8ef53b 6e8bf23b ee8eff3b ee8bfc3b ee8ffe3b 6e8af53b ee8ef33b ee8cf13b 6e8aff3b 6e8ff3b 6e85f73b 6e83f33b ee87ff3b ee87f33b |
| 77d5d717 | efff1b00 7fff1b00 |
| efff1b00 | ecfeff3b |
| 7fff1b00 | ecfeff3b 79feff3b ee8df53b ee8ffb3b ee8cf83b 6e8ff53b ee8df33b ee8bfa3b ee8df63b 6e8ef13b ee87f03b 6e82fb3b 6e87f43b 6e87fd3b 6e82f73b 6e8fd3b ee8bf53b 6e8cf03b ee8bf93b 6e85f93b ee82f63b 6e87f83b ee82f33b 6e8cf33b ee8af13b 6e8ff03b 6e8dfe3b ee8afb3b 6e8df23b 6e83fb3b |
| 6bfffb67 | f9ffff3b |
| 6e8cfa3b | ecfeff3b |
| ee86f13b | ecfeff3b |

FIG. 4

ARTIFICIAL INTELLIGENCE-BASED FUZZING OF CYBER-PHYSICAL SYSTEMS

CROSS-REFERENCE TO RELATED APPLICATIONS

This application claims priority to U.S. Provisional Application No. 63/082,703, filed Sep. 24, 2020, which is hereby incorporated by reference in its entirety.

STATEMENT REGARDING FEDERALLY SPONSORED RESEARCH OR DEVELOPMENT

The invention described herein was made with U.S. government ("Government") support under Contract No. FA8650-19-P-1855, awarded by the Air Force Research Laboratory ("AFRL"). As a result, the Government has certain rights in this invention.

FIELD OF THE DISCLOSURE

This disclosure relates generally to cyber-physical systems and, more specifically, the intelligent fuzzing of these systems. In particular, the present application relates to the automatic identification of vulnerability in cyber-physical systems that are effectively a "black box," i.e., systems in which a user does not have access to the system such that the user can extract control flow graphs, track code coverage, and the like.

BACKGROUND

Cyber-physical systems integrate computers and computing processes, computer networks, and physical processes into whole systems that have one or more mechanisms controlled by computer algorithms. Examples of cyber-physical systems include smart grid, autonomous automobile systems, medical monitoring, industrial control systems, robotics systems, and automatic pilot avionics. Both private enterprises and governments use cyber-physical systems, leading to the necessity of protecting these systems against cyber-attacks. However, security and vulnerability/threat detection is made more complicated by the fact that many cyber-physical systems are so-called "black box" systems, in which access to the system's source code, documentation, and/or firmware is not available.

For these "black box" systems, a standard testing approach called "fuzzing" is used, in which random inputs are supplied to the system to determine if any crashes or other vulnerabilities are detected. The advantage of fuzzing is that little knowledge is needed about the system, but a major disadvantage is that fuzzing is slow due to the random nature of the inputs it generates. For example, many systems expect certain sequences of inputs prior to undertaking any actions (such as, for example, the "handshake" that occurs when initializing an http connection), and the probability of randomly "guessing" a handshake from random inputs is very small. Thus, this approach, also referred to as "dumb fuzzing" is often too slow in practice simply due to the number of possible input combinations.

Given the foregoing, there exists a significant need for new devices, systems, and methods to detect vulnerabilities in cyber-physical systems, including, for example, "black box" systems, as well as new methods for intelligently fuzzing these systems that are more effective than the current dumb fuzzing approaches used in the art.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In general, the present disclosure is directed to devices, systems, and methods for utilizing artificial intelligence (AI) to intelligently fuzz cyber-physical systems, including, for instance, "black box" systems in which a user does not have access to critical components of the system, such as, for example, the source code, documentation, firmware, or the like.

Various embodiments of the present disclosure utilize communication logs obtained from the cyber-physical system of interest in order to build a model of typical communications in that system. Once such a model has been constructed, it is then used to guide fuzzing of the system. In particular, the model provides the user with the system message that is "expected" at a given time, which can then be used to manipulate the system to test the system's response to malformed or otherwise unexpected inputs that could be indicative of an attack.

One of skill in the art will recognize that tools like boofuzz (available at the github.com website) contain libraries of common protocols (such as, for example, http, ftp, and the like) from which a user can select. Other fuzzing tools like American Fuzzy Lop (AFL) (also available at the github.com website) either instrument the binary or use emulators such as QEMU to track progress through the system. In this way, AFL can determine which inputs lead to new states and which do not. Unfortunately, in the field of cyber-physical systems, the protocol used for communications between two pieces of equipment may not be known by the users performing the testing. Furthermore, because many components of cyber-physical systems are linked with, among other things, sensors, other physical components, and other equipment, emulation of this networked system is challenging even if the source code/binary for all relevant components is available.

Therefore, embodiments of the present disclosure enable users to fuzz "black box" systems by opening the "black box" and gaining an understanding of how the system functions without the need for a priori knowledge about, or access to, specific components of the system, including, for instance, the system's source code.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIG. 1 is an exemplar communications log of a cyber-physical system, with incoming messages received, as well as each message's respective timestamp, displayed in table form, according to at least one embodiment of the present disclosure.

FIG. 4 is a lookup table that illustrates the one or more output message options for each input message, according to at least one embodiment of the present disclosure.

DETAILED DESCRIPTION

Figure 2:
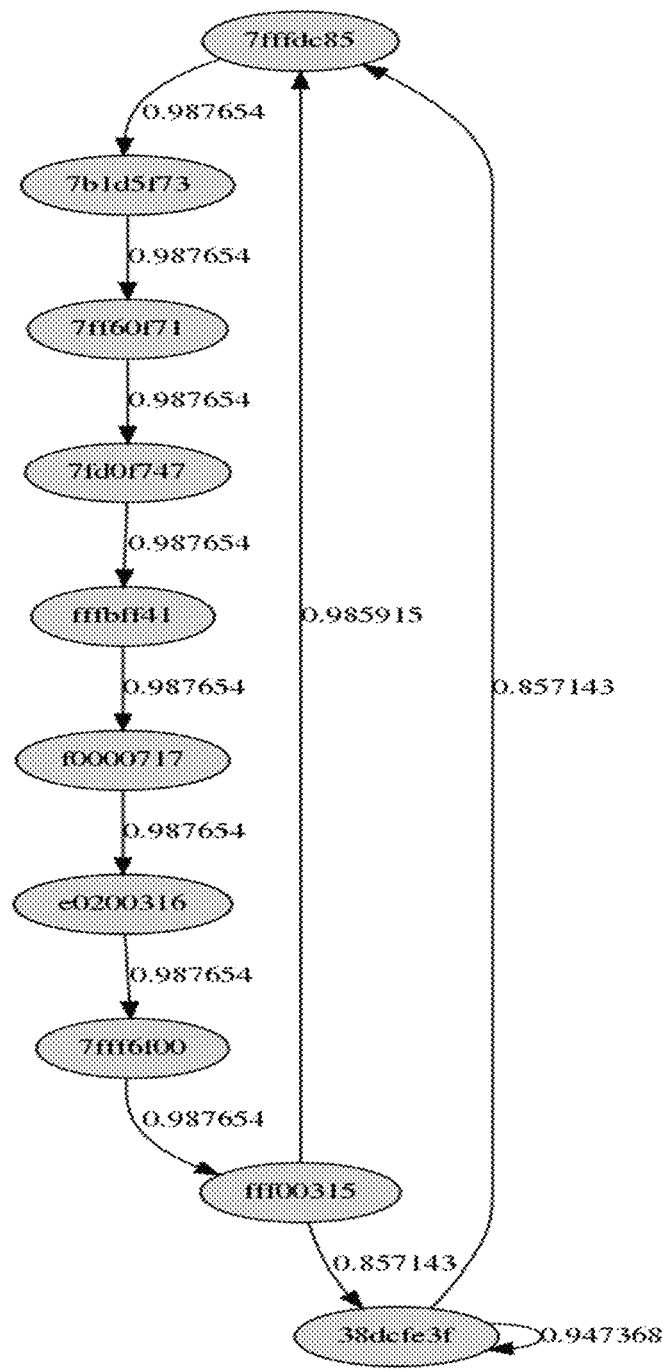
FIG. 2 is a dependency graph generated from the exemplar communications log depicted in FIG. 1, according to at least one embodiment of the present disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of." Similarly, the term "consisting essentially of" is intended to include embodiments encompassed by the term "consisting of." Although having distinct meanings, the terms "comprising," "having," "containing," and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users and to their client computing devices/platforms. In general, the users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g., a user may type out a response or input an action, or may choose form preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

Generally, embodiments of the present disclosure are directed towards devices, systems, and methods to intelligently fuzz cyber-physical systems in order to identify vulnerabilities. Intelligent fuzzing is especially useful for cyber-physical systems that are a "black box," i.e., systems in which a user does not have access to the binary, meaning the user can neither extract control flow graphs nor instrument the binary to track code coverage like AFL.

Embodiments of the present disclosure utilize process modeling principles to learn the rules and conditions that govern the communication between various elements in a cyber-physical network. One of skill in the art will recognize that process modeling is prevalent in business applications as a way of distilling business practices from activity logs. Known process modeling techniques include, for example, Mealy and Moore machines, as well as more general models such as petri nets or dependency graphs that can capture concurrent behavior.

One or more embodiments of the present disclosure utilize process models for three different purposes. First, such models are used to define the "normal" behavior and inputs of the cyber-physical system for which a user wishes or needs to determine vulnerabilities. One of skill in the art will appreciate that these "normal" behaviors and inputs are such that, if altered, would constitute a successful attack on the cyber-physical system. Second, process models are used to identify when and where communication occurs in the system, thereby enabling fuzzed messages to be input at appropriate times in the communication process. Third, process models are used to identify messages and how the system typically responds to them in order to infer the nature of communication, or attempted communication, that is occurring. This assumes that both the source of the message and the destination use an identical protocol when communicating with each other, which is often the case.

One of skill in the art will appreciate that there are a number of different approaches for inferring process models, and that which approach (or approaches) are used depends, in part, on the type of cyber-physical system being analyzed. Purely as a non-limiting example, data from a cyber-physical system can be analyzed to identify dependency graphs and related causal nets.

The first step, as stated above herein, is to characterize what is meant by "normal" behavior, i.e., behavior from which deviation will constitute a successful attack on the cyber-physical system. To define such "normal" behavior, a model is constructed that describes the communications between the cyber-physical system being tested (referred to herein as the "system under test" or "SUT") and its environment, including, for example, other systems on the same network. Accordingly, at least one embodiment defines "normal" behavior to be typical signals and/or communications (referred to collectively as "messages" herein) that are transmitted from and/or to the SUT. The inputs used to construct the model are taken from a data log of messages, and their respective timestamps, obtained from the SUT.

Turning now to FIG. 1, an exemplary data log of messages is shown in table format. Both the message itself, as well as its respective time stamp, are identified by alphanumeric strings. One of skill in the art will appreciate that the precise format of the log can differ from the format shown in FIG. 1, but it should be appreciated that that data log must, at minimum, contain: (1) a timestamp or other basis for establishing the relative ordering of messages, (2) the actual message sent, and (3) sufficient information to establish the sender and the receiver. For the data represented in FIG. 1 and in the rest of the figures herein, there are only two devices, so determining the specific "channel" on which messages are received is sufficient to determine the sender and the receiver.

Using the data shown in FIG. 1, "invariants," i.e., relationships between entries that always happen, can be extracted. Purely as a non-limiting example, every time the message identified as "7b1d5f73" appears, it is preceded by the message identified as "7fffdc85." As a result, one of skill in the art can conclude that "7b1d5f73" is dependent upon "7fffdc85," providing an example of "normal" behavior for the specific cyber-physical system that produced the message data in FIG. 1.

It should be appreciated that it is possible for multiple entries to be dependent on the same input. As another non-limiting example, in FIG. 1, both "38dcfe3f" and "7fffdc85" are dependent upon "fff00315."

More specifically, a causal model can be generated using the data shown in FIG. 1, which describes the relationship between the messages sent by the components in the SUT. It should be appreciated that many different algorithms can be utilized for inferring the causal model, including, but not limited to, the heuristic miner algorithm (described further in Weijters, A. J. M. M., Wil MP van Der Aalst, and AK Alves De Medeiros: "Process mining with the heuristics miner-algorithm." *Technische Universiteit Eindhoven, Tech. Rep. WP* 166 (2006): 1-34, which is incorporated by reference in its entirety), which has been previously used to model business processes from event data.

At least one embodiment implements a variant of the heuristic miner algorithm, searching through the data log(s)

and counting the number of times that different temporal relationships occur. Purely as a non-limiting example, suppose there are two messages labeled A and B in the log file. These relations are simple: $A >_1 B$, which is the number of times that A immediately precedes B in the log; and $A >_N B$, which is the number of times that A appears N steps before B in the log.

Causal relationships can then be extracted from these log occurrences. The most important of these relationships is the dependency relationship, or, utilizing the aforementioned example, $A \Rightarrow B$ (i.e., that A causes B to appear). The strength of the dependency relationship is given by the following equation:

$$A \Rightarrow B = \frac{(A >_1 B) - \alpha(B >_1 A)}{(A >_1 B) + (B >_1 A) + \gamma},$$

where $\alpha \geq 1$ is a weighting factor.

As a non-limiting example, consider the relationship f0000717⇒e0200316 using the data in the log in FIG. 1. In that log, note that f0000717 directly precedes e0200316 in the log twice, so $f000717 >_1 e0200316 = 2$. On the other hand, e0200316 never directly precedes f000717, so $e0200316 >_1 f000717 = 0$. Therefore, $$f0000717 \Rightarrow e0200316 = \frac{2 - \alpha \cdot 0}{2 + 0 + \gamma},$$

which can be evaluated once the parameters $\alpha$ and $\gamma$, which are described below, are provided.

One of skill in the art will appreciate that the confidence of A causing B is higher the more frequently A is immediately before B in the data log, and that that confidence is consequently diminished whenever B is immediately before A. For data logs that have a large amount of noise, $\alpha \sim 1$, and for data logs with very little (or no) noise, $\alpha \rightarrow \infty$ since B preceding A at any point is strong evidence that A generally does not cause B (although some exceptions to this rule will be discussed later herein). To avoid being overly confident about causal relations given limited data, a weighting factor, $\gamma$, is included in the denominator. This weighting factor controls how rapidly the confidence in this causal relation approaches the maximum value of 1. A typical choice of $\gamma$ is 1, but the value may be higher if the user desires more samples be observed before the system is confident in a causal relation.

The output of the above-mentioned analysis is a set of confidence values for the causal relation $A \Rightarrow B$ (i.e., the message A causes the message B to appear). This assumes that each message in the causal model must be caused by some other message, so for each B, all causal relations that generate B (e.g., $A \Rightarrow B$, $C \Rightarrow B$, $D \Rightarrow B$) are retained, as long as the confidences are within a selected threshold (which varies based on the situation) of the maximum confidence achieved given the available data. Note that the theoretical maximum is 1, but the actual values will always be less than that given $\gamma > 0$. Any causal relations with confidence values less than the product of the threshold and the maximum achieved confidence are removed. This is intended to eliminate spurious causal relations in the dependency graph, an example of which is shown in FIG. 2.

Turning now to FIG. 2, each node is a message, the arrows denote the ⇒relation (i.e., the causal relation(s) between messages), and the numbers indicate confidence intervals. It should be appreciated that, in situations where extracting invariants is straightforward, the dependency graph is not necessarily distinguishable from a simple finite state machine. To illustrate the difference, consider a finite state machine with the same connections as the dependency graph in FIG. 2. For the finite state machine, if the system were in state fff00315 it could transition to either state 38dcfe3f or 7fffdc85 but not both. The dependency graph, however, denotes that fff00315 causes 38dcfe3f or 7fffdc85 or both to appear. This is useful in situations where multiple concurrent actions are being performed as a single "split" in the graph that can capture the creation of both actions. At any junction in the dependency graph, a user can, in principle, take any combination of outputs, rather than just a single output.

Since the dependency graph shown in FIG. 2 is generated from a log of "normal" messages, the graph sets forth the bounds of "normal" behavior for the cyber-physical system being analyzed. While any potential attack should be verified, the attack may be presumed to be successful if it manages to disrupt, or otherwise alter, the "normal" behavior of the system.

Further understanding of the nature of the communications in the system can be achieved by methods known in the art for identifying, for example, sequence numbers, packet numbers, counters, ASCII strings, checksums, handshakes, and other indicators and/or data that would provide information regarding the messages sent to and/or from the system. This can be accomplished by analyzing the dependency graph for repeated patterns. For example, a handshake prior to a sequence of communications can be identified by a common sequence consisting of a message to the system and followed by a response from the system and then a sequence of messages to the system that differ with the data transferred. As a result, one or more embodiments may manipulate data from the cyber-physical system, such as, for example, inverting data, reversing data, and flipping data bits to see if non-standard input data are correctly parsed and formatted. As an example, once a sequence number (i.e., a number that that labels the location of a message within a larger sequence) is identified, this number can be manipulated by either skipping numbers, repeating the same number, or decrementing numbers to search for system failures.

Additional procedures can also be implemented, including, as a non-limiting example, repeating the causal model generation process using longer distance relationships ($A >_N B$, where $N > 1$), thereby generating dependency graphs over longer time horizons, which may be important for different cyber-physical systems. Furthermore, additional mining steps to identify parallel or other relations can be applied to determine if "junctions" in the dependency graph are AND relations (i.e., all paths must be taken), XOR relations (i.e., a single path must be taken), or any combination of these two relations. These enhancements are well known in the art and implemented by algorithms like the Heuristic Miner algorithm.

As mentioned previously herein, the output of the causal modeling process described above is a set of expected causal relationships obtained from the log data. The purpose of these causal relationships is to guide the fuzzing process by ensuring that the system can respond to the SUT in a reasonable manner. For example, the SUT may require a successful handshake before additional messages are accepted. Using the causal modeling, the system can learn to correctly respond to the handshake before fuzzing the input messages by randomly adjusting bits.

Figure 3:
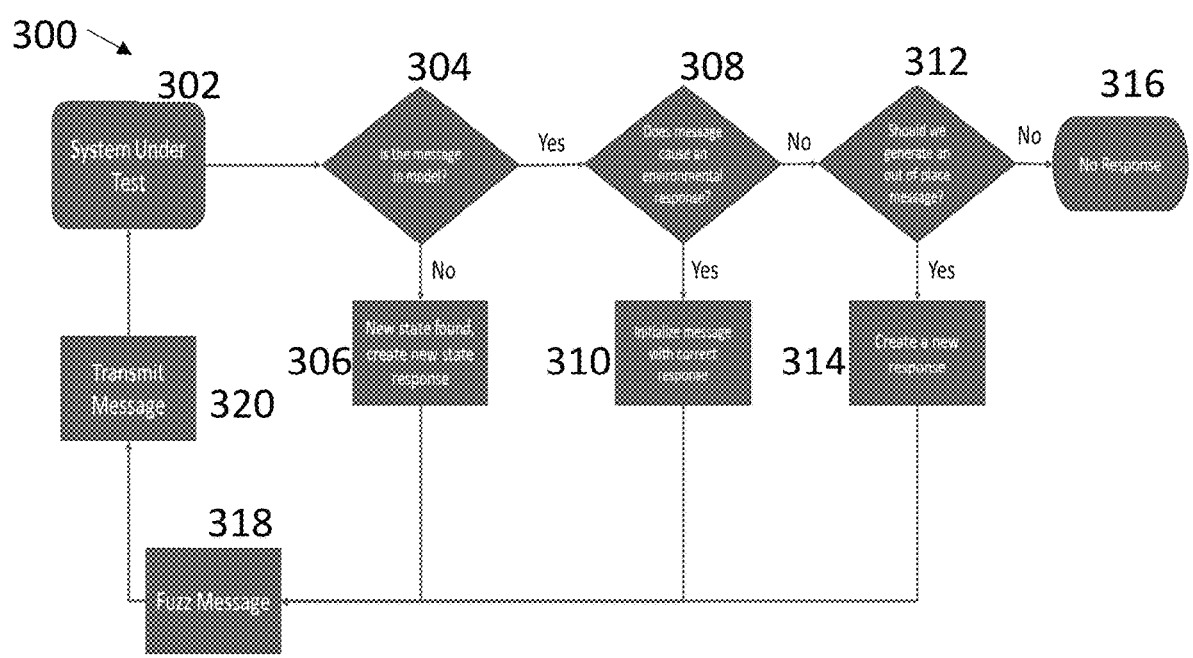
FIG. 3 is a flow chart illustrating the fuzzing process, according to at least one embodiment of the present disclosure.

Turning now to FIG. 3, a flow chart is shown for a fuzzing process 300 in accordance with one or more embodiments.

Generally, given a message transmitted by the SUT, the model is queried to see if that message: (1) is contained within the model, and (2) has a causal relation with an environmental response in the model. The answers to the aforementioned two questions determine the specific response to the message, as set forth in further detail below.

More specifically, and with particular reference to FIG. 3, the incoming message is processed in three stages. First, upon receiving a message from the SUT 302, the model is queried at step 304 to determine if the message/state is contained within the model. If it is not, then the fuzzing process has encountered a new state, meaning that the system generates an initial new state message based on that user's specific settings, as shown at step 306. This new message could include, as a non-limiting example, generate a completely random sequence, using the response from the nearest state in the model based on a given metric, such as, for instance, a message with the most matching components like the message type and destination, or choose not to respond at all. Second, if the message/state is contained within the model, the dependency graph is queried to determine if receipt of the message causes a response from the environment, as shown at step 308. If such receipt is supposed to cause a response from the environment, one of the valid responses for that input is chosen and used as an initial message, as shown at step 310. This process may be implemented as a lookup table, a non-limiting example of which is shown in FIG. 4. Third, if a response from the environment is not expected in the model, the system testing the SUT may choose to transmit a message anyway, as shown at step 312. This tests the SUT's ability to cope with unexpected inputs. In such a situation, a problem-specific "out of place" message is generated, as shown at step 314, which could be, but is not limited to, for example, a random sequence, "replaying" or repeating the last message transmitted, or sending a fixed response. Otherwise, no response is sent by the environment, as shown at step 316, and the system performing the test waits for the next message transmitted by the SUT. The output of these three steps 306, 310, 314 is an initial message, which can then be fuzzed at step 318, and transmitted at step 320 to the SUT, as described below.

The start of the intelligent fuzzing process, which is shown by step 310, is described with particular reference to FIG. 4, a table which displays the one or more output messages (the right-hand column) that result for a given input message (the left-hand column). The presence of multiple output messages for a given input message indicates that there are multiple possible responses for that given input message. The table of FIG. 4 therefore enables the system testing the SUT to choose and send an initial message to the SUT. A skilled artisan will therefore appreciate that the table shows various "rules" for communications extracted from the dependency graph. That is, the table shows the various conditions for messages that exist in "normal" communications in the cyber-physical system.

Using the data in FIG. 4, mapping from inputs to outputs can be achieved, allowing for the intelligent fuzzing of the system. To accomplish this, given a specific input precondition, an output can be chosen randomly from the list of available outputs. It should be appreciated that this method allows for a search space that is significantly smaller than if all 231 options were to be searched. One of skill in the art will recognize that 231 options exist since the data messages described herein are 32-bits long, and one of the bits is used to check message validity and therefore would not be fuzzed.

A user can fuzz the initial message generated from the process described in FIG. 3 by altering that message's contents. It should be appreciated that a relatively simple fuzzing can be used, such as, for example, the fuzzing policy for the ARINC429 protocol, flipping a parity bit and another randomly chosen bit in the word. It should further be appreciated, however, that more complex fuzzing policies can be used, including, but not limited to, randomly manipulating particular fields (e.g., the label or sequence field) if they are known or controlling the type of perturbations (e.g., replacing letters with other letters). If the particular field(s) are not known, a user may examine the data and attempt to infer the field(s). In principle, any fuzzing technique can be applied, since fuzzing only occurs when and where a response is relevant.

Once a fuzzed message has been generated, it is then transmitted to the SUT on the appropriate channel. The response of the SUT is then observed and the overall method described herein is repeated until a vulnerability is identified or until the user stops the process. The system can identify multiple vulnerabilities including, for instance, if the SUT fails to respond to any message (e.g., it crashed), or if the SUT responds differently to valid message sequences. One output is therefore an extended log, which may be used to update the causal model and improve performance in future iterations. This extended log would be similar in form to FIG. 1 but with the additional inputs/outputs recorded during the fuzzing process.

One of skill in the art will appreciate that one or more embodiments enable a user to more intelligently find vulnerabilities in a cyber-physical system. Purely as a non-limiting example, rather than randomly guessing and generating words or packets of data, a user can modify or mutate sections of messages for the SUT. For instance, one or more ACKs (the control character used in the Transmission Control Protocol (TCP) to positively acknowledge receipt of a data packet) can be changed to one or more NAKs (the negative acknowledgement signal used in the TCP). As another non-limiting example, response messages for handshake requests can be squelched. These modifications or mutations therefore enable the user to determine whether, and how, the SUT will respond to potential attacks or disruptions that modify nominal system behavior.

In addition to altering the packet data, the various embodiments can detect the timing of when messages are sent. Messages can be sent to the cyber-physical system only at times most likely to produce a meaningful response. These times might be, for instance, based on the common response times observed in the log data, which may provide meaningful information as to whether an attack might have occurred. It should be appreciated that messages can also be sent to the system deliberately at unexpected times to observe how the system responds. Such a response can provide additional information as to the performance of the system and its ability to repel potential attacks.

It should further be appreciated that one or more embodiments may utilize AI or other similar methods, such as, for instance, reinforcement learning, that enable intelligent fuzzing, thereby enabling the rapid identification of critical vulnerabilities in SUTs. Use of such methods is a major advantage when compared to dumb fuzzing, which is slow, not repeatable, and difficult to compare across different systems and/or platforms.

Figure 5:
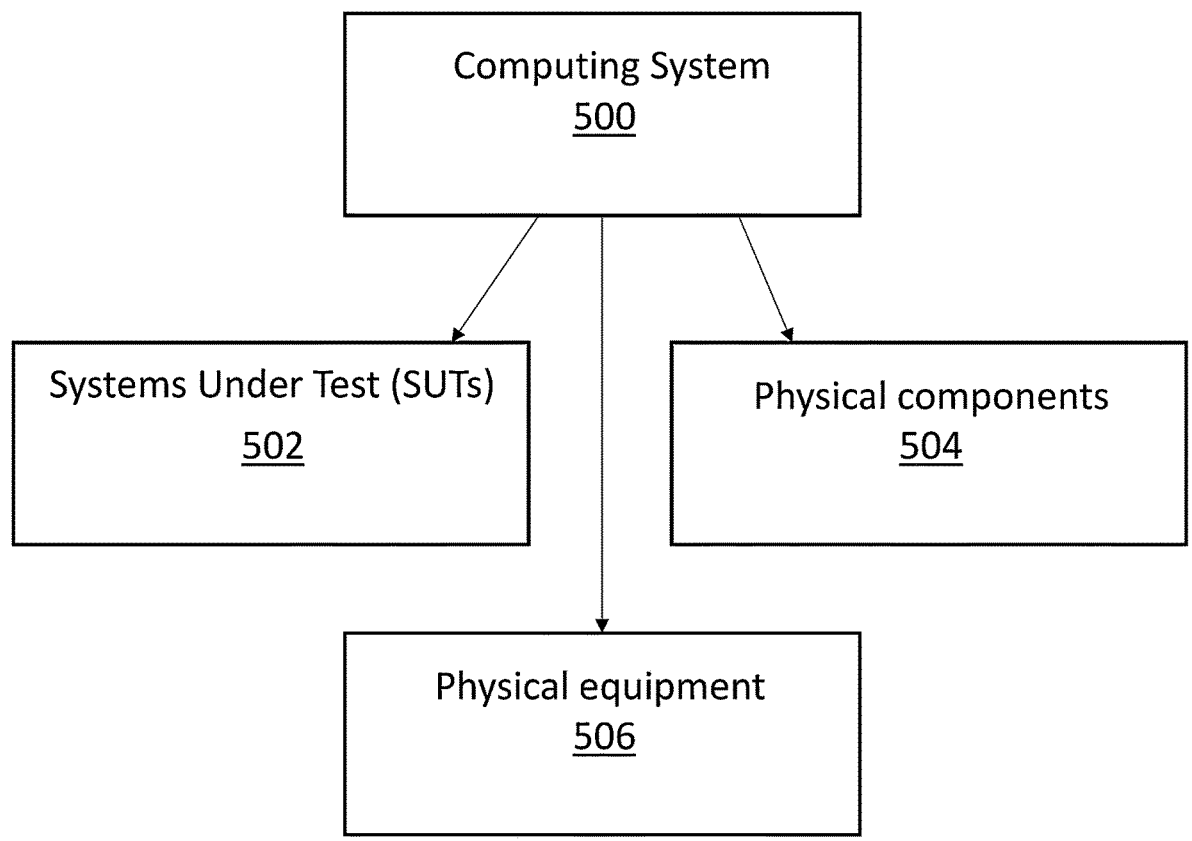
FIG. 5 is a diagram of a computing system for fuzzing one or more cyber-physical systems, according to at least one embodiment of the present disclosure.

Turning now to FIG. 5, a block diagram is shown of a computing system 500 for fuzzing one or more cyber-physical systems that may, for instance, be linked with physical components and/or equipment (e.g., sensors). Thus, the computing system 500 may control, monitor, and/or extract data from one or more systems under test (SUTs) 502, one or more physical components 504, and/or one or more pieces of physical equipment 506. As stated above herein, the computing system may use AI, reinforcement learning, and/or other similar methods.

Figure 6:
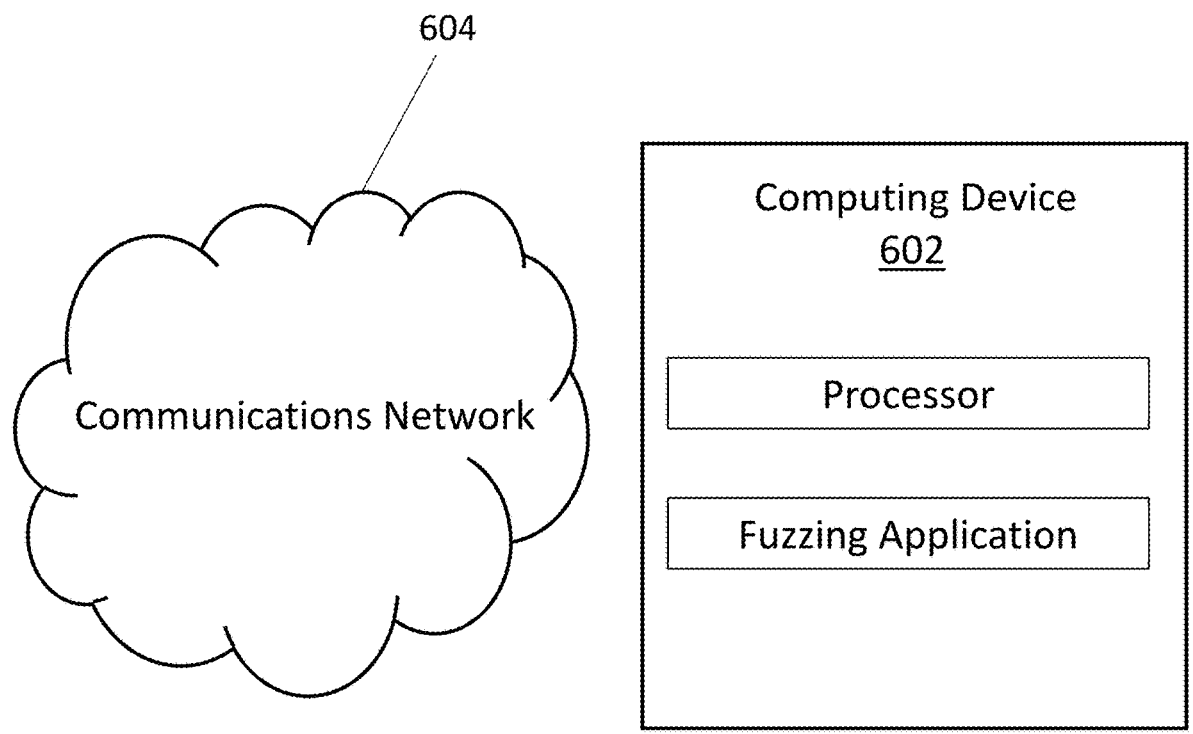
FIG. 6 is a diagram of one or more computing devices for fuzzing one or more systems under test (SUT), according to at least one embodiment of the present disclosure.

The computing system may, in at least one embodiment, comprise one or more computing devices 602, as shown in FIG. 6. The one or more computing devices 602 may execute one or more applications to fuzz the one or more SUTs, which may include, for example, fuzzing applications that utilize one or more models described above herein (e.g., a model to describe the communications between a given SUT and its environment, which may include the one or more physical components and/or physical equipment described above herein, a model to describe the relationship(s) between the messages sent by components or portions of a given SUT, etc.). Such applications may be driven, in whole or in part, by AI, reinforcement learning, etc. A skilled artisan will appreciate that the one or more computing devices 602 may obtain, using methods or procedures known in the art, data associated with a specific SUT (e.g., data regarding internal communications within the SUT and/or external communications between the SUT and its environment). Such data can be analyzed and/or interpreted by the aforementioned one or more applications. This analyzed and/or interpreted data can then be used to determine the SUT's potential vulnerabilities (e.g., potential system crashes, malicious attacks, etc.). The applications can further be capable of scheduled or triggered communications or commands when various events occur (e.g., potential attacks on the SUT, unusual internal or external communications that may identify a potential attack, etc.).

The one or more computing devices 602 can be used to store acquired data from one or more SUTs (e.g., the one or more SUTs 502), as well as other data in memory and/or database. The memory may be communicatively coupled to one or more hardware processing devices which are capable of utilizing AI, machine learning, etc. Such data may include, for example, communications between a given SUT and its environment, which may include the one or more physical components and/or physical equipment described above herein, messages sent by components or portions of a given SUT, timing of these messages, expected causal relationships between these messages, and the like.

The one or more computing devices 602 may further be connected to a communications network 604, which can be the Internet, an intranet, or another wired or wireless communications network. For example, the communications network 604 may include a network utilizing the Aeronautical Radio, Inc. (ARINC) 429 standard, the ARINC 618 standard, the ARINC 620 standard, and/or the ARINC 622 standard, a Mobile Communications (GSM) network, a code division multiple access (CDMA) network, 3rd Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The one or more computing devices 602 include at least one processor to process data and memory to store data. The processor processes communications, builds communication relationships, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of a fuzzing application. In addition, the one or more computing devices 602 further include at least one communications interface to transmit and receive communications, messages, and/or signals.

Thus, information processed by the one or more computing devices 602, or the applications executed thereon, may be sent to another computing device, such as a remote computing device, via the communications network 604. As a non-limiting example, information relating to one or more communications or messages sent or received by a given SUT, or by components or portions thereof, may be sent to one or more other computing devices.

Figure 7:
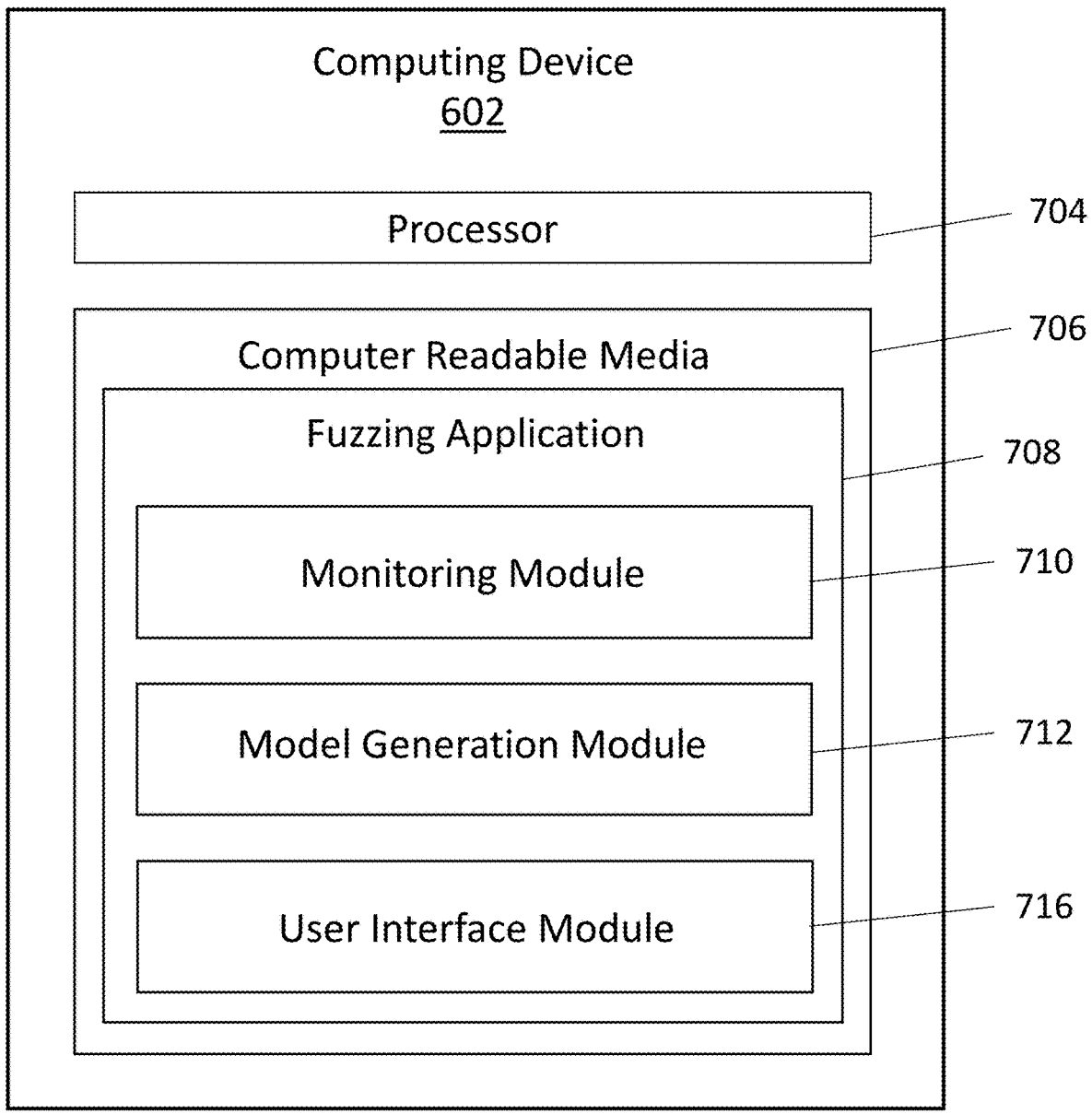
FIG. 7 is a diagram of a computing device including memory on which a fuzzing application is stored, according to at least one embodiment of the present disclosure.

FIG. 7 illustrates a block diagram of a computing device 602 according to an example embodiment. The computing device 602 includes computer readable media (CRM) 706 in memory on which a fuzzing application 708 or other user interface or application is stored. The computer readable media may include volatile media, nonvolatile media, removable media, non-removable media, and/or another available medium that can be accessed by the processor 704. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media (e.g., Ethernet, Thunderbolt, serial, universal serial bus (USB), etc.) or system, both of which are hardware.

Such fuzzing application 708 includes a monitoring module 710 and a model generation module 712. The monitoring module 710 is operable to obtain, monitor, and/or collect one or more communications or messages sent or received by a given SUT, or by components or portions thereof. The model generation module 712 is operable to generate one or more models based on collected data or information, including, for instance, the aforementioned one or more communications or messages. One or more of these modules may be driven, in whole or in part, by AI, reinforcement learning, or the like. The fuzzing application 708 may also be operable to query the one or more models generated to determine whether a particular communication or message is indicative of a vulnerability, attempted malicious attack, etc.

Using a local high-speed network, the computing device 602 may receive the aforementioned one or more communications or messages from the SUT in real time or near real time so that the fuzzing provided by the fuzzing application 708 can also be performed in real time or near real time.

Methods or processes, such as the fuzzing process run by, e.g., the fuzzing application 708 may be monitored to generate an event and an alert upon the occurrence of a given condition (e.g., detection of a potential system vulnerability or potential malicious attack). Such alerts may be sent in real-time or near real-time using an existing uplink or dedicated link. The alerts may be sent using email, SMS, push notification, or using an online messaging platform to end users and computing devices.

In at least some embodiments, the computing device 602 can operate one or more feedback controls allowing alterations to the generation and/or the execution of one or more models, or of the fuzzing process more generally. Such alterations may be done, for instance, to detect different types of system vulnerabilities or to determine whether different types of communications or messages are expected within the system. The computing device 602 can further operate to implement additional procedures relating to model generation or to fuzzing. A non-limiting example of such additional procedures, as described above herein, is repeating a causal model generation process using longer distance relationships to generate dependency graphs over longer time horizons.

The fuzzing application 708 may provide data visualization using a user interface module 716 for displaying a user interface on a display device. As an example, the user interface module 716 generates a native and/or web-based graphical user interface (GUI) that accepts input and provides output viewed by users of the computing device 602. The computing device 602 may provide real-time automatically and dynamically refreshed information on the status and/or content of one or more messages or communications, the possibility of a potential system vulnerability or potential malicious attack, etc. The user interface module 716 may send data to other modules of the fuzzing application 708 of the computing device 602, and retrieve data from other modules of the performance optimization application of the computing device 602 asynchronously without interfering with the display and behavior of the user interface displayed by the computing device 602.

These and other objectives and features of the invention are apparent in the disclosure, which includes the above and ongoing written specification.

Any of the processes, methods, and algorithms described in any of the preceding sections may be embodied in, and fully or partially automated by, code instructions executed by one or more computer systems or computer processors comprising computer hardware. The processes and algorithms may be implemented partially or wholly in application-specific circuitry.

Further, any process descriptions, elements, or units in the diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

We claim:

1. A method for detecting vulnerabilities in a cyber-physical system, the method comprising:
    defining, by at least one processor, a default state of a cyber-physical system, wherein the default state comprises a plurality of messages, and wherein the default state represents expected functioning of the cyber-physical system;
    identifying, by the at least one processor, one or more dependency relationships between one or more of the plurality of messages;
    generating, by the at least one processor, an expected response message to an incoming message sent by the cyber-physical system based on the one or more dependency relationships;
    fuzzing, by the at least one processor, the expected response message and transmitting the expected response message to the cyber-physical system; and
    recording, by the at least one processor, any response from the cyber-physical system to the fuzzed expected response message.

2. The method of claim 1, wherein the defining further comprises:
    obtaining at least one data log from the cyber-physical system, wherein the at least one data log comprises at least some of the plurality of messages.

3. The method of claim 2, further comprising:
    extracting invariants from the at least one data log, wherein the invariants are relationships between entries in the at least one data log that always occur.

4. The method of claim 2, wherein the defining further comprises:
    generating a causal model from the at least one data log, wherein the causal model describes relationships between at least some of the plurality of messages.

5. The method of claim 4, wherein the generating further comprises:
    querying the causal model to determine if the incoming message either is contained within the causal model or has a causal relation with an environmental response in the causal model.

6. The method of claim 4, further comprising:
    utilizing one or more algorithms to infer the causal model, wherein the one or more algorithms comprises the heuristic miner algorithm.

7. The method of claim 4, wherein the identifying further comprises:
    calculating dependency strength for at least one of the one or more dependency relationships.

8. The method of claim 6, wherein the identifying further comprises:
    generating a dependency graph based on the one or more dependency relationships.

9. The method of claim 7, wherein the generating further comprises:
    querying the dependency graph to determine if receipt of the incoming message causes the cyber-physical system to respond in the causal model.

10. The method of claim 7, further comprising:
analyzing the dependency graph for repeated patterns in the one or more dependency relationships.

11. The method of claim 1, wherein the generating further comprises:
implementing a lookup table to determine the expected response message for the incoming message.

12. The method of claim 1, wherein the fuzzing further comprises:
altering contents of the expected response message.

13. The method of claim 12, wherein the altering further comprises:
randomly manipulating one or more fields of the expected response message.

14. The method of claim 12, wherein the altering further comprises:
replacing at least one letter in the expected response message with at least one other, different letter.

15. The method of claim 1, further comprising:
detecting when at least one of the plurality of messages is sent.

16. The method of claim 1, wherein the fuzzing is performed using artificial intelligence (AI).

17. A method for fuzzing a system under test (SUT), the method comprising:
receiving, by at least one processor, one or more messages transmitted by a system under test (SUT);
querying, by the at least one processor, a model to determine if the one or more messages is contained within the model;
if the one or more messages is not contained within the model, generating, by the at least one processor, a new state message;
if the one or more messages is contained within the model, querying, by the at least one processor, a dependency graph to determine if receipt of the one or more messages causes a response;
if receipt of the one or more messages causes a response, choosing and sending, by the at least one processor, a valid response to the one or more messages; and
if receipt of the one or more messages does not cause a response, either transmitting an "out of place" message or not transmitting, by the at least one processor, a response.

18. The method of claim 17, wherein the new state message comprises a first random sequence of letters and/or numbers that is based on a message contained within the model that is similar to the one or more messages, and wherein the "out of place" message comprises a second random sequence of letters and/or numbers, a repetition of the last message transmitted, or a fixed response set by a user.

19. The method of claim 17, further comprising:
fuzzing the new state message;
fuzzing the valid response; and/or
fuzzing the "out of place" message.

20. A system for fuzzing a system under test (SUT), the system comprising:
at least one computer comprising at least one processor operatively connected to at least one non-transitory computer readable medium, the at least one non-transitory computer readable medium having computer-executable instructions stored thereon, wherein, when executed by the at least one processor, the computer executable instructions execute operations comprising:
receiving one or more messages transmitted by a system under test (SUT);
querying a model to determine if the one or more messages is contained within the model;
if the one or more messages is not contained within the model, generating a new state message;
if the one or more messages is contained within the model, querying a dependency graph to determine if receipt of the one or more messages causes a response;
if receipt of the one or more messages causes a response, choosing and sending a valid response to the one or more messages, wherein the valid response is contained within the model;
if receipt of the one or more messages does not cause a response, either transmitting an "out of place" message or not transmitting a response, wherein the "out of place" message comprises a random sequence of letters and/or numbers, a repetition of a previous transmitted message, or a fixed response set by a user; and
fuzzing the new state message, fuzzing the valid response, and/or fuzzing the "out of place" message, wherein the valid response is selected from a lookup table that displays one or more output messages that result from a given input message.

* * * * *